(No Model.)
R. MANNESMANN.
VEHICLE POLE.
No. 552,917.
Patented Jan. 14, 1896.
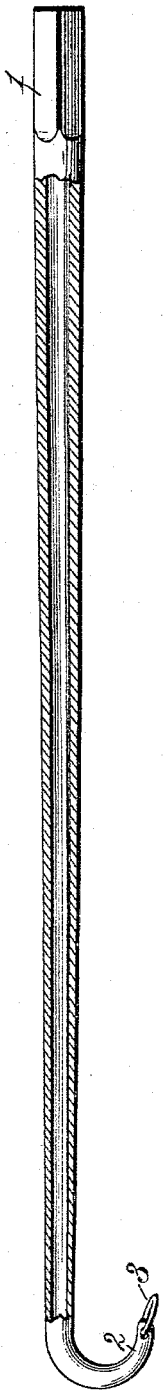
Witnesses.
Robert Everett,
A. H. Norris.
Inventor:
Reinhard Mannesmann.
By James L. Norris.
Atty.

UNITED STATES PATENT OFFICE.

REINHARD MANNESMANN, OF NEW YORK, N. Y., ASSIGNOR TO THE MANNESMANN TUBE COMPANY, OF JERSEY CITY, NEW JERSEY.

VEHICLE-POLE.

SPECIFICATION forming part of Letters Patent No. 552,917, dated January 14, 1896.

Application filed March 6, 1895. Serial No. 540,770. (No model.)

*To all whom it may concern:*

Be it known that I, REINHARD MANNESMANN, a citizen of Germany, residing at New York, in the county of New York and State of New York, have invented new and useful Improvements in Vehicle Poles or Tongues, of which the following is a specification.

This invention relates to poles or tongues particularly designed for the carriages of howitzers and other guns, but useful in connection with wheeled vehicles of any character drawn by draft-animals.

The invention has for its object to provide a seamless elastic tubular pole or tongue, which possesses great strength and durability with a comparatively small quantity of metal and consequent diminished weight, so that the pole or tongue is rendered very light and symmetrical, while the necessary body and thickness of metal is obtained at the point where the pole or tongue is secured to the hounds or other part of the wheeled vehicle.

The invention also has for its object to provide a tubular metallic pole or tongue, which is seamless and weldless and possesses the characteristic of elasticity for the purpose of reducing liability of bending, breaking, or cracking, and producing a very strong and substantial article, which is susceptible of being economically manufactured by simplified tube-making machinery and is superior in actual use.

To accomplish these objects my invention consists essentially in a pole or tongue for a wheeled vehicle consisting of a tapering rolled seamless elastic tube of steel or other metal, having its shell gradually decreased in thickness from the point of attachment or the rear end of the pole or tongue to the front extremity thereof.

The invention also consists in a pole or tongue for wheeled vehicles consisting of a tapering rolled seamless elastic tube of steel or other metal, having its front end formed into a curved holdback-hook, and its shell gradually decreased in thickness from the point of attachment or rear end to the front extremity of the curved holdback-hook.

The invention is illustrated in the accompanying drawing, in which the figure is a sectional side elevation of a pole or tongue constructed in accordance with my invention, and particularly designed for the carriage of a howitzer, but useful for any wheeled vehicle.

In order to enable those skilled in the art to make and use my invention, I will now describe the same in detail, referring to the drawing, wherein it will be observed that the pole or tongue is hollow or tubular, and is constructed at its rear end with an enlarged approximately square portion 1, designed for connecting with the hounds or other part of a gun-carriage or other wheeled vehicle to which poles or tongues are ordinarily attached.

The rear end portion of the pole or tongue is of angular form for the purpose of rendering it possible to practicably and properly attach it to the vehicle.

The front end portion of the pole or tongue is formed into a curved holdback-hook 2, having a suitable device, as at 3, for the attachment of the holdback chains or straps. The device for connecting the holdback chains or straps may be a ring, hook, or any other contrivance suitable for the purpose.

The pole or tongue uniformly tapers or decreases in diameter from the extreme rear end thereof to the extremity of the holdback-hook 2, and the shell of the structure gradually and uniformly diminishes in thickness from the rear extremity of the tubular body to the front end portion thereof, all in such manner that a pole or tongue is obtained which possesses the characteristics of great strength and durability with a comparatively small quantity of metal and a greatly-diminished weight. By gradually and uniformly diminishing the thickness of the shell of the structure from the rear end to the front end thereof, the pole or tongue is rendered light and symmetrical, and a practicable substitute for wooden poles or tongues is obtained, which can be very economically manufactured by simplified tube-making machinery.

The improved pole or tongue will be found superior in actual use.

The peculiar construction of the pole or tongue described and shown can be readily produced by the well-known Mannesmann tube-making machinery and process or method of operation.

In the practical manufacture of the pole or tongue a seamless elastic tube is produced by the well-known Mannesmann process by rolling a hollow or solid blank or ingot of steel or other metal into a seamless elastic tube.

The angular rear potion of the pole or tongue can be produced in any suitable manner, and by the Mannesmann process this rear end may be left closed or solid and of angular form, while the remaining portion is tubular, and the tube-shell gradually diminishes in thickness to the front end of the article.

The pole or tongue is seamless and weldless, and consequently the liability of bending, breaking, or cracking is entirely avoided, which is not the case where hollow or tubular poles or tongues are constructed with a seam or weld.

Having thus described my invention, what I claim is—

1. A pole or tongue for wheeled vehicles, consisting of a tapering, rolled, seamless, elastic tube of steel, or other metal, having the shell thereof decreased in thickness from the point of attachment or rear end to the front extremity.

2. A pole or tongue for wheeled vehicles, consisting of a tapering, rolled, seamless, elastic tube of steel, or other metal, having its shell gradually and uniformly diminished in thickness from the rear to the front end portion thereof.

3. A pole or tongue for wheeled vehicles, consisting of a tapering, rolled, seamless, elastic tube of steel or other metal, provided with an angular rear end portion, and having its shell gradually diminished in thickness from the rear to the front extremity.

4. A pole or tongue for wheeled vehicles, consisting of a tapering, rolled, seamless, elastic tube of steel, or other metal, formed at its front extremity into a curved, hold-back hook, and having its shell gradually diminished in thickness from the rear to the front end portion.

In testimony whereof I have hereunto set my hand in presence of two subscribing witnesses.

REINHARD MANNESMANN.

Witnesses:
EMIL KIPPER,
ALBERT H. NORRIS.